United States Patent [19]

Yamasaki et al.

[11] 4,087,058
[45] May 2, 1978

[54] SPINNING REEL WITH SEPARATE ANTI-REVERSAL AND CLICKING MECHANISMS

[75] Inventors: Tatuya Yamasaki, Fuchi; Kounin Sazaki, Fukuyama, both of Japan

[73] Assignee: Ryobi, Ltd., Hiroshima, Japan

[21] Appl. No.: 758,881

[22] Filed: Jan. 12, 1977

[30] Foreign Application Priority Data

Jan. 14, 1976 Japan .................................. 51-3052

[51] Int. Cl.² ...................... A01K 89/01; A01K 89/02
[52] U.S. Cl. .............................................. 242/84.51 A
[58] Field of Search ................... 242/84.2 R, 84.2 A, 242/84.21 R, 84.21 A, 84.1 R, 219, 218, 217, 84.51 R, 84.5 A

[56] References Cited

U.S. PATENT DOCUMENTS

| | | | |
|---|---|---|---|
| 3,059,873 | 10/1962 | Hull | 242/84.2 A |
| 3,123,319 | 3/1964 | Hull | 242/84.51 A |
| 3,490,714 | 1/1970 | Underwood et al. | 242/219 X |
| 3,796,395 | 3/1974 | Rankin, Jr. | 242/84.5 R |

FOREIGN PATENT DOCUMENTS

719,041  11/1954  United Kingdom ......... 242/84.51 A

Primary Examiner—Billy S. Taylor
Attorney, Agent, or Firm—Sughrue, Rothwell, Mion, Zinn and Macpeak

[57] ABSTRACT

A spinning reel having jointly controlled but separate anti-reversal and clicking mechanisms of simple and improved construction. The clicking mechanism thereby provides an audible clicking sound to indicate that the anti-reversal mechanism is engaged when retrieving or rewinding the fishing line.

6 Claims, 2 Drawing Figures

SPINNING REEL WITH SEPARATE ANTI-REVERSAL AND CLICKING MECHANISMS

BACKGROUND OF THE INVENTION

This invention relates to a spin fishing reel having separate reverse rotation preventing and warning sounding mechanisms.

In the prior art spinning reels, a ratchet gear and pawl arrangement functions both as a reverse rotation preventing mechanism and as a warning sounding mechanism. Typically, a rotary outer frame which carries a pivotable bail is axially secured to a pinion gear driven by a master gear, and is prevented from rotating in a direction opposite to the fishing line wind-in direction. When the rotary outer frame is rotated in the wind-in direction, a continuous clicking sound is made by the contact between the teeth of the ratchet gear and its associated, spring biased pawl, whereby the fisherman can readily recognize that the reversal preventing mechanism is engaged and operative. In the prior art the reversal preventing mechanism inherently provides this warning sound, which advantageously reduces the number of mechanical parts. However, a relatively large pawl is required to obtain sufficient mechanical strength, which makes it difficult to provide a desirably loud acoustic warning sound. That is, the size of the ratchet gear and pawl are largely dictated by the mechanical requirements of the reverse rotation preventing mechanism, and the acoustic warning requirements are entitled to only a secondary consideration. Furthermore, when the reversal control lever is ON and the outer frame is rotated in the rewind direction to retrieve the fishing line, the spring biased pawl collides with each tooth of the ratchet gear, whereby excessive abrasion and wear occurs.

SUMMARY OF THE INVENTION

Briefly, and in accordance with the present invention, these drawbacks and disadvantages of the prior art are objectively overcome by providing jointly controlled but separate anti-reversal and warning sound mechanisms of simple and improved construction. The anti-reversal mechanism comprises a ratchet gear and a pivotal pawl, with a pair of rigidly mounted leaf springs on the pawl frictionally engaging or clasping the ratchet gear in a caliper-like manner. During rewind, the springs hold off the pawl such that it does not contact the ratchet gear teeth, thereby reducing wear and abrasion. At the commencement of any reverse rotation, the springs pull the pawl down into halting engagement with the ratchet gear.

The separate warning sound or clicking mechanism is implemented by a pivoted, spring biased pawl, specifically designed to provide the desired acoustic sound, which engages a toothed gear integral with the primary gear in the reel housing.

Both mechanisms are jointly controlled or engaged by separate cams mounted on a single lever shaft.

DETAILED DESCRIPTION OF THE PREFERRED EMBODIMENT

Figure 1:
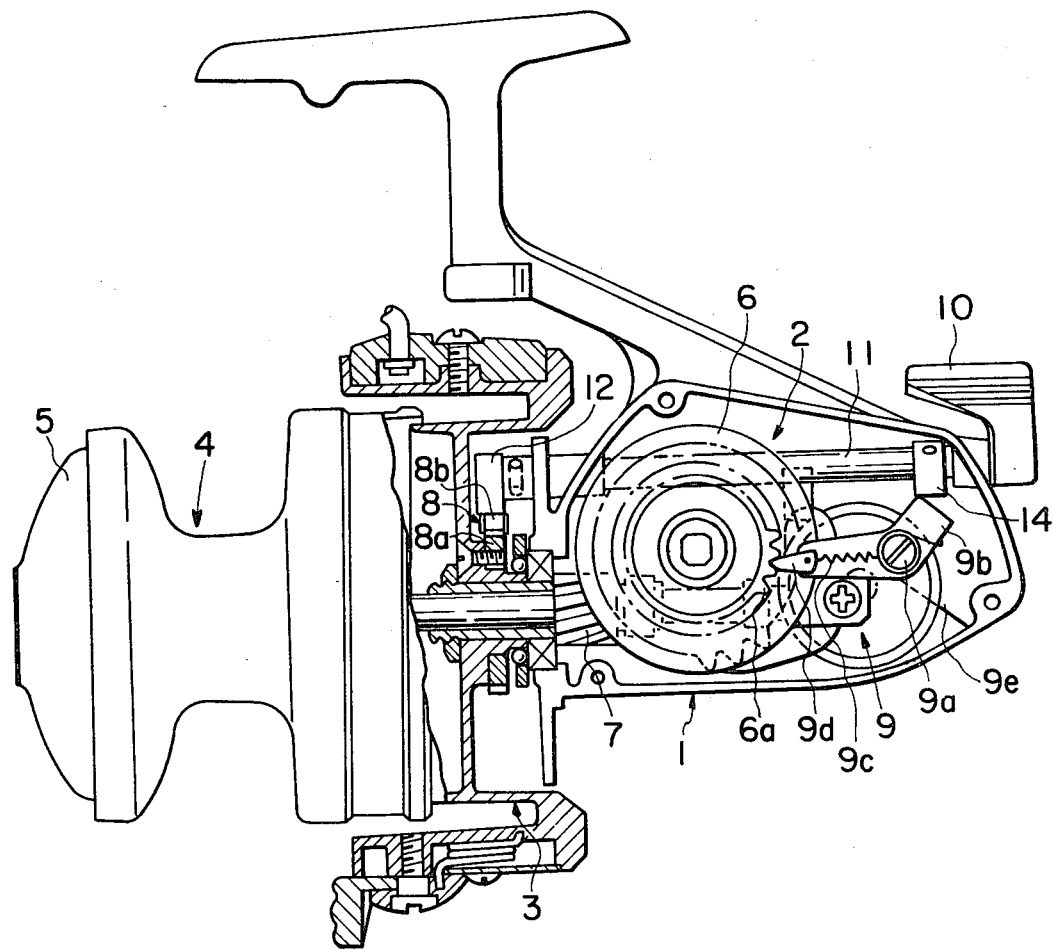
FIG. 1 shows a fragmentary vertical sectional view of a preferred embodiment of a fishing reel according to the present invention.

Referring now to the accompanying drawings, a fishing reel body 1 includes a housing cavity 2 adapted to be covered with a side plate (not shown), a rotary outer frame 3, a line spool 4 having a conventional frictional drag device, and a drag adjusting knob 5. The outer frame 3 is rotated by a handle (not shown) which transmits torque through a driving gear coaxially secured to a primary gear 6 rotatably supported in the body 1. The driving gear engages a pinion 7.

Figure 2:
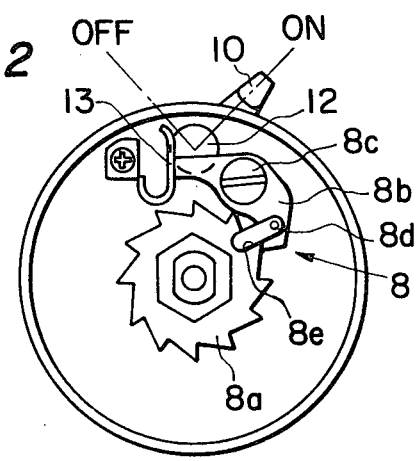
FIG. 2 shows a front view of the reverse rotation preventing mechanism of FIG. 1.

A reverse rotation preventing mechanism 8 is mounted on the outer frame 3, as best shown in FIG. 2. This mechanism comprises a ratchet gear 8a secured to the outer frame 3, a pivotally mounted ratchet pawl 8b engageable with the ratchet gear, and a pair of leaf springs 8e rigidly secured at their one ends to the pawl 8b by a pin 8d in order to resiliently engage and press against the opposite sides of the ratchet gear 8a at their other ends in a tweezer or caliper-like manner. The pawl pivots about a pin 8c. When the ratchet gear 8a is rotated in the rewind direction (clockwise in FIG. 2), the springs 8e, which lie at an angle to the ratchet gear axis, are pushed by their frictional engagement with the ratchet gear and pivot the pawl 8b in a counter-clockwise direction about its pivot pin 8c. This lifts the pawl out of engagement with the ratchet gear, and holds it out of engagement during continued rewind, thereby reducing wear and abrasion. When the ratchet gear 8a attempts to rotate in the opposite, counter-clockwise direction, the springs 8e are pulled by the ratchet gear which in turn rotates the pawl 8b in a clockwise direction to haltingly engage the next ratchet gear tooth. This implements a positive locking engagement, whereby the fishing line is prevented from unwinding except when the drag force is overcome.

The clicking mechanism 9 shown in FIG. 1 includes gear teeth 6a adapted to be engaged by a pawl 9d pivotally mounted to one end of a crank arm 9b. One end of the pawl 9d is connected to a spring 9c whose other end is connected to a pivot pin 9a. With this arrangement, a desirable clicking sound is produced by the skipping contact between the gear teeth 6a and the pawl 9d when the line is retrieved with the anti-reversal mechanism engaged.

Both the anti-reversal mechanism 8 and the clicking mechanism 9 are controlled by the ON-OFF operation of a cam shaft 11 rotated by a thumb lever 10. When the lever 10 is positioned at OFF, a cam 12 fixed to one end of the shaft 11 contacts the tapered end portion of the ratchet pawl 8b and rotates it in a counter-clockwise direction. This prevents any engagement between the ratchet gear 8a and the pawl 8b, regardless of the direction of rotation of the gear 8a. A spring 13 engages flats on the cam 12 to positively position it at ON or OFF. Further, a cam 14 fixed to the shaft 11 is rotated up and out of contact with the crank arm 9b when the lever 10 is set at OFF, whereby a spring 9e rotates the crank arm in a counter-clockwise direction to disengage the clicking mechanism. Conversely, when the thumb lever 10 is set at ON, the cam 12 releases the pawl 8b such that it is free to rotate in a clockwise direction to implement the anti-reversal function, and simultaneously the cam 14 rotates the crank arm 9b in a clockwise direction, against the force of spring 9e, to engage the clicking mechanism. The separate reversal rotation preventing mechanism 8 and clicking mechanism 9 are thus jointly engaged and disengaged by the single control means 10-14.

The clicking mechanism may also be designed such that the gear teeth 6a function both as the clicker teeth and as part of the torque driving train engaging the pinion 7.

If the gear teeth 6a are provided on one side of the primary gear 6, it is possible to integrally mold the dual toothed gear 6 as a single component, and it is also possible to provide specially designed gear teeth directly mounted on the primary gear.

Further, by properly designing the teeth 6a, a desired acoustic characteristic may be obtained.

What is claimed is:

1. In a spinning reel including a housing; a primary gear rotatably mounted in the housing; a drive shaft, journalled for rotation in the housing, carrying a pinion gear engaged with the primary gear, and extending out of the housing; and an outer frame secured to the outwardly extending end of the drive shaft for rotation therewith, the improvements comprising:
   (a) an anti-reversal mechanism including a ratchet gear secured to the outer frame for rotation therewith about the drive shaft's axis, and a stop pawl selectively engageable with the ratchet gear and pivotally mounted to the housing,
   (b) a clicking mechanism for providing an audible clicking sound during rewind and including a toothed gear secured to the primary gear for rotation therewith about a second axis different from said drive shaft's axis, and a spring biased detent pawl selectively engageable with the toothed gear and pivotally mounted to the housing, and
   (c) a selection shaft journalled for rotation in the housing and carrying individual cam means for controlling the simultaneous engagement and disengagement of both the anti-reversal mechanism and the clicking mechanism, respectively.

2. A spinning reel as defined in claim 1, wherein the anti-reversal mechanism further includes a pair of elongated, parallel leaf springs rigidly mounted to opposite sides of the stop pawl at their one ends and frictionally clasping the ratchet gear at their other ends in a tweezers-like manner, the longitudinal axes of the leaf springs lying to one side of the ratchet gear axis, whereby the springs push the stop pawl out of engagement with the ratchet gear teeth during rewind and pull the stop pawl into engagement with a ratchet gear tooth if the ratchet gear rotates in an anti-rewind direction.

3. A spinning reel as defined in claim 1, wherein the clicking mechanism further includes a crank arm pivotally mounted to the housing, the detent pawl being pivotally mounted to one end of the crank arm and the cam means engaging the other end of the crank arm, and spring means for biasing the crank arm and detent pawl out of engagement with the toothed gear.

4. A spinning reel as defined in claim 2, wherein the clicking mechanism further includes a crank arm pivotally mounted to the housing, the detent pawl being pivotally mounted to one end of the crank arm and the cam means engaging the other end of the crank arm, and spring means for biasing the crank arm and detent pawl out of engagement with the toothed gear.

5. A spinning reel as defined in claim 4, wherein the cam means comprises first and second spaced cams, the first cam engaging the stop pawl and the second cam engaging the crank arm.

6. A spinning wheel as defined in claim 5, wherein the planes of rotation of said drive shaft's axis and said second axis are perpendicular to each other, and wherein said drive shaft's axis is parallel to the axis of said selection shaft.

* * * * *